(12) United States Patent
Yasumura

(10) Patent No.: US 6,515,875 B2
(45) Date of Patent: Feb. 4, 2003

(54) SWITCHING POWER SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/993,220

(22) Filed: Nov. 19, 2001

(65) Prior Publication Data

US 2002/0071294 A1 Jun. 13, 2002

(30) Foreign Application Priority Data

Nov. 15, 2000 (JP) ........................................ 2000-352539

(51) Int. Cl.$^7$ ............................................. H02M 3/335
(52) U.S. Cl. ...................................... 363/21.02; 363/97
(58) Field of Search ............................. 363/18, 19, 20, 363/21.01, 21.02, 21.03, 95, 97

(56) References Cited

U.S. PATENT DOCUMENTS

| | | | | |
|---|---|---|---|---|
| 5,920,466 A | * | 7/1999 | Hirahara | 363/21.02 |
| 6,262,897 B1 | * | 7/2001 | Yasumura | 363/21.02 |
| 6,324,081 B1 | * | 11/2001 | Sakamoto et al. | 363/25 |
| 6,349,046 B2 | * | 2/2002 | Yasumura | 363/21.02 |
| 6,356,465 B2 | * | 3/2002 | Yasumura | 363/21.02 |
| 6,370,043 B1 | * | 4/2002 | Yasumura | 363/21.02 |
| 6,396,717 B2 | * | 5/2002 | Yasumura | 363/21.02 |
| 6,411,528 B1 | * | 6/2002 | Yasumura | 363/19 |
| 6,456,509 B1 | * | 9/2002 | Yasumura | 363/21.02 |

* cited by examiner

*Primary Examiner*—Adolf Deneke Berhane
(74) *Attorney, Agent, or Firm*—Frommer Lawrence & Haug LLP; William S. Frommer

(57) ABSTRACT

A power supply circuit has a so-called composite resonance type switching converter equipped with a primary resonance circuit for forming a voltage resonance type converter at a primary side, and a secondary resonance circuit comprising a secondary winding and a secondary parallel resonance capacitor at a secondary side. The secondary side is equipped with active clamp means for stabilizing a DC output low voltage taken out from an intermediate tap of the secondary winding to control the conduction angle of an auxiliary main switching element in accordance with the level of the DC output low voltage, whereby the power loss due to the cross-regulation of the DC output low voltage can be reduced, and the power conversion efficiency can be enhanced.

2 Claims, 11 Drawing Sheets

SWITCHING POWER SUPPLY CIRCUIT

BACKGROUND OF THE INVENTION

1. Field of the Invention

The present invention relates to a switching power supply circuit equipped to various types of equipment as a power supply source.

2. Description of the Related Art

The applicant of this application previously proposed a technique of constructing a composite resonance type converter as a switching power supply circuit by combining a voltage resonance type converter of one stone at a primary side and a half-wave rectifying type voltage resonance circuit at a secondary side, providing an active clamp circuit at the secondary side and stabilizing the DC output voltage thereof by controlling the conduction angle of the switching element of the active clamp circuit.

FIG. 10 is a circuit diagram of a conventional switching power supply circuit which can be constructed on the basis of the invention previously proposed by the applicant of this application.

In the power supply circuit shown in FIG. 10, a full-wave rectifying circuit comprising a bridge rectifying circuit Di and a smoothing capacitor Ci is equipped as a rectifying and smoothing circuit to which commercial alternating power (alternating input voltage VAC) is input to achieve a DC input voltage, whereby the rectified and smoothed voltage Ei corresponding to the once level of the alternating input voltage VAC is achieved.

At the primary side of the power supply circuit, a self-excited type is constructed as a voltage resonance type converter circuit which carries out a single-end operation on the basis of a one-stone switching element Q1. In this case, a bipolar transistor having high resistance to voltage (BJT; junction type transistor) is used as the switching element Q1.

The base of the switching element Q1 is connected to the anode of the smoothing capacitor Ci (rectified and smoothed voltage Ei) through a starting resistor Rs to achieve base current at the starting time from a rectifying and smoothing line.

A drive winding NB which is provided at the primary side of an insulating converter transformer PIT so as to have a turn number of 1T (turn), and a series resonance circuit for self-excited resonance driving which comprises a series an inductor LB, a resonance capacitor CB and a base current limiting resistor RB is connected between the base of the switching element Q1 and the earth at the primary side. A switching frequency fs for turning on/off the switching element Q1 is generated by the self-excited circuit. For example, the switching frequency fs is set to 66 KHz by the series resonance circuit.

A route for clamp current flowing when the switching element Q1 is turned off is formed by a clamp diode DD1 inserted between the base of the switching element Q1 and the cathode (the earth at the primary side) of the smoothing capacitor Ci. The collector of the switching element Q1 is connected to one end of the primary winding N1 of the insulating converter transformer PIT, and the emitter thereof is grounded.

A parallel resonance capacitor Cr is connected between the collector and emitter of the switching element Q1 in parallel. In this case, a primary series resonance circuit of the voltage resonance type converter is formed by the capacitance of the parallel resonance capacitor Cr itself and the leakage inductance L1 of the primary winding N1 side of the insulating converter transformer PIT.

The insulating converter transformer PIT transmits the switching output of the switching element Q1 to the secondary side. The insulating converter transformer PIT is equipped with an EE-type core comprising two E-type cores of ferrite material or the like which are assembled such that both the magnetic legs thereof are confronted to each other, and the primary winding N1 and the secondary winding N2 are wound around the center magnetic leg of the EE-type core by using a divisional bobbin so as to be separated from each other. Further, the EE-type core is assembled so that a gap is formed in the center magnetic leg thereof, whereby loose coupling based on a required coupling coefficient is achieved.

One end of the primary winding N1 of the insulating converter transformer PIT is connected to the switching element Q1, and the other end thereof is connected to the anode of the smoothing capacitor Ci (rectified and smoothed voltage Ei). Accordingly, an alternating voltage having the period corresponding to the switching frequency occurs at the primary winding N1 when the switching output of the switching element Q1 is supplied to the primary winding Ni.

Further, at the secondary side of the insulating converter transformer PIT, an alternating voltage induced by the primary winding N1 is generated at the secondary winding N2. In this case, a secondary parallel resonance capacitor C2 is connected to the secondary winding N2 in parallel, so that a parallel resonance circuit is formed by the leakage inductance L2 of the secondary winding N2 and the capacitance of the secondary parallel resonance capacitor C2. The parallel resonance circuit sets the alternating voltage induced in the secondary winding N2 to a resonance voltage, so that a voltage resonance operation can be achieved at the secondary side. That is, the power supply circuit described above has the construction of a "composite resonance type switching converter" in which a parallel resonance circuit for setting the switching operation to a voltage resonance type is provided at the primary side and a parallel resonance circuit for achieving the voltage resonance operation is provided at the secondary side.

The secondary side of the power supply circuit thus constructed is equipped with a half-wave rectifying circuit comprising a secondary rectifying diode D01 and a smoothing capacitor C01 which are connected to the secondary winding N2, thereby achieving a main secondary DC output voltage E01 corresponding to substantially the once level as the alternating voltage induced in the secondary winding N2.

Further, in this case, an intermediate tap is provided to the secondary winding N2, and a half-wave rectifying circuit comprising a rectifying diode D02 and a smoothing capacitor C02 is connected to the winding between the tap output line of the secondary winding N2 and the earth at the secondary side as shown in FIG. 10 to generate and output a low secondary DC output voltage E02.

In the power supply circuit, an active clamp circuit is equipped to the secondary side. That is, an auxiliary switching element Q2 of MOS-FET, a clamp capacitor C3 and a clamp diode DD2 are equipped as the secondary active clamp circuit. Further, a drive winding Ng1, a capacitor Cg1 and a resistor Rg1 are equipped as a driving circuit system for driving the auxiliary switching element Q2.

A clamp diode DD2 is connected between the drain and source of the auxiliary switching element Q2 in parallel. As a connection manner, the anode of the clamp diode DD2 is connected to the source, and the cathode is connected to the drain.

The drain of the auxiliary switching element Q2 is connected to the connection point between the tap output line of the secondary winding N2 and the anode of the rectifying diode D02 through a clamp capacitor C3. Further, the source of the auxiliary switching element Q2 is connected to the earth at the secondary side.

Accordingly, the secondary active clamp circuit is constructed by connecting the clamp capacitor C3 to the parallel connection circuit comprising the auxiliary switching element Q2 and the clamp diode DD2 in series. The circuit thus formed is further connected to the secondary winding N2 in parallel.

As the driving circuit system of the auxiliary switching element Q2, a series connection circuit of a capacitor Cg1, a resistor Rg1 and a drive winding Ng1 is connected to the gate of the auxiliary switching element Q2 as shown in FIG. 10. The series connection circuit forms the self-excited driving circuit for the auxiliary switching element Q2. That is, a signal voltage VGS from the self-excited type driving circuit is applied to the gate of the switching element Q2 to perform the switching operation. In this case, the drive winding Ng1 is formed at the end portion side of the secondary winding N2, and the number of turns in this case is set to 1T (turn), for example.

Accordingly, the voltage induced by the alternating voltage achieved at the primary winding N1 occurs at the drive winding Ng1. Further, in this case, voltages achieved at the secondary winding N2 and the drive winding Ng1 are opposite in polarity because of the relationship of the winding direction between the windings N2 and Ng1.

In this embodiment, PWM control is carried out on the switching operation of the auxiliary switching element Q2 by a control circuit 1 equipped to the secondary side. That is, the secondary DC output voltage E01, E02 is supplied to the control circuit of an error amplifier, and the control circuit 1 applies the DC control voltage corresponding to E01, E02 to the gate of the auxiliary switching element Q2 to control the conduction angle of the auxiliary switching element Q2, whereby the DC output voltage is stabilized with respect to variations of the alternating input voltage VAC and the load power Po. For example, the main DC output voltage E01 is stabilized to 135V.

In the circuit construction described above, the insulating converter transformer PIT may be EE-40 under the condition that the gap is set to 1 mm, the number of turns of the primary winding N1 is set to 50T, the number of turns of the secondary winding N2 is set to 55T and the number of turns of the drive winding NB=Ng1 is set to 1T. Further, the resistance of the starting resistor Rs is set to 330 KΩ, the resistance of the resistor RB is set to 1Ω, the capacitance of the capacitor CB is set to 0.33 μF, the inductance of the inductor LB is set to 10 μH, the capacitance of the resonance capacitor Cr is set to 0.012 μF, the resistance of the resistor Rg1 is set to 10Ω, the capacitance of the resonance capacitor C2 is set to 0.012 μF, the capacitance of the clamp capacitor C3 is set to 0.47 μF, and the switching frequency fs is equal to 66 KHz.

FIG. 11 shows the operation waveforms of the respective parts at the alternating input voltage VAC of 100V and the load power Po of 200 W. FIG. 12 shows the operation waveforms of the respective parts under no load and at the alternating input voltage VAC of 100V. It is apparent from FIGS. 11 and 12 that the conduction angle (TON period) of the auxiliary switching element Q2 is controlled in accordance with the variation of the load power Po.

FIG. 13 shows the characteristic of the conduction angle (TON) and the AC/DC power conversion efficiency ηAC/DC with the variation of the load power Po, and FIG. 14 shows the characteristic of the conduction angle (TON) and the AC/DC power conversion efficiency ηAC/DC with the variation of the alternating input voltage VAC. As is apparent from FIGS. 13 and 14, the conduction angle (TON) of the auxiliary switching element Q2 with respect to the variation of the load power Po and the alternating input voltage VAC is controlled over the range from 4.6 μs to 13 μs.

As the conduction angle (TON) is increased due to reduction of the load power Po or increase of the alternating input voltage VAC, the conduction loss of the auxiliary switching element Q2 is increased and thus the AC/DC power conversion efficiency (ηAC/DC) is lowered.

Further, the primary side voltage resonance pulse voltage V1 occurring between both the ends of the main switching element Q1 is equal to 530V to 850V when the alternating input voltage VAC ranges from 90V to 144V, and thus the main switching element Q1 is required to have a voltage resistance to 900V. Further, the clamp voltage V2 at the secondary side is equal to 160V to 350V, and thus the auxiliary switching element Q2 is required to have a voltage resistance to 400V.

Current having a saw-tooth waveform flows in the switching elements Q1, Q2 under the no-load state as indicated by current IQ1, IC3 in FIG. 7. Therefore, these large amounts of current flow in the primary winding N1, the secondary winding N2 of the insulating converter transformer PIT and each switching element Q1, Q2, so that invalid current is increased and the input power at this time is equal to 13.5 W.

When stabilization is carried out on the main voltage (DC output main voltage) E01=135V with respect to the variations of the alternating input voltage VAC and the load current on the basis of the conduction angle control of the auxiliary switching element Q2 of the secondary active clamp circuit, the auxiliary DC output voltage (DC output low voltage) E02, which is equal to 15V for example, exhibits cross regulation of 15V±1.5V.

When the load current of the DC output low voltage E02 is varied by 0.5 A to 1.5 A, the cross regulation is further magnified to 15V±2.5V.

Therefore, in order to achieve a voltage-stabilized output voltage of 12V with a three-terminal regulator having a low saturation voltage, the power loss of (17.5–12.0)×1.5=8.25 w at maximum occurs and thus the power conversion efficiency is further lowered.

As is understood from the foregoing description, the following problems (1) to (4) occur in the construction of the power supply circuit of FIG. 10 as described above, that is, in the construction in which the switching frequency of the auxiliary switching element Q2 of the active clamp circuit is fixed and the DC output voltage is stabilized by controlling the conduction angle.

(1) the conduction time of the secondary auxiliary switching element Q2 is increased due to reduction of the load power Po and increase of the alternating input voltage VAC, and thus the power loss is also increased, resulting in reduction in efficiency.

(2) The peak value of the voltage resonance pulse voltage VI occurring in the primary switching element Q1 increases in proportion to the alternating input voltage VAC, so that the switching element Q1 has a voltage resistance to 900V in the AC 100V system and a voltage resistance to 1800V in the AC 200V system. Therefore, an expensive switching element Q1 must be prepared.

(3) Under the no-load state, the invalid power is large, and the voltage resonance pulse voltage V1 is larger than under a load-applied state, so that a heat radiating plate is needed to the auxiliary switching element Q2.

(4) Since the cross regulation of the DC output lower voltage E02 taken out from the secondary side is large, a three-terminal series regulator is required to stabilize the DC output low voltage E02, and thus the power loss is further increased. Therefore, the power conversion efficiency is lowered.

SUMMARY OF THE INVENTION

Therefore, in consideration of the foregoing problems, according to the present invention, there is provided a switching power supply circuit comprising: switching means having a main switching element for conducting a switching operation on a DC input voltage and outputting a switching result; an insulating converter transformer that is designed so as to provide a coupling coefficient required for the loose coupling between a primary side and a secondary side, and transmits the output of the switching means achieved at the primary side to the secondary side; a primary parallel resonance circuit constructed by connecting a primary parallel resonance capacitor to a primary winding wound around the converter transformer equivalently and in parallel; a first secondary parallel resonance circuit constructed by connecting a first secondary parallel resonance capacitor to a secondary winding wound around the insulating converter transformer in parallel; first DC output voltage generating means for receiving an alternating voltage achieved at the secondary winding wound around the insulating converter transformer and conducting a rectifying operation on the alternating voltage thus received to a DC output main voltage; first stabilized voltage control means for performing voltage-stabilizing control on the DC output main voltage by controlling the switching frequency and conduction angle of the main switching element in accordance with the level of the DC output main voltage; a second secondary parallel resonance circuit constructed by connecting, in parallel, a second secondary parallel resonance capacitor to the winding portion between an intermediate tap of the secondary winding wound around the insulating converter transformer and the earth at the secondary side; second DC output voltage generating means for receiving an alternating voltage achieved at the intermediate tap of the secondary winding wound around the insulating converter transformer and conducting a rectifying operation on the alternating voltage thus received to achieve a DC output low voltage; active clamp means constructed by connecting, in parallel, a series connection circuit comprising a clamp capacitor and an auxiliary switching element to the winding portion between the intermediate tap of the secondary winding wound around the insulating converter transformer and the earth at the secondary side; and second voltage-stabilizing control means for executing the conduction angle control of the auxiliary switching element in accordance with the level of the DC output low voltage to perform the voltage-stabilizing control on the DC output low voltage.

In the switching power supply circuit thus constructed, there is achieved a so-called composite resonance type switching converter in which the primary resonance circuit to form the voltage resonance type converter is provided at the primary side, and the secondary resonance circuit comprising the secondary winding and the secondary parallel resonance capacitor is provided at the secondary side. On the basis of this construction, the active clamp means for stabilizing the DC output low voltage taken from the intermediate tap of the secondary winding is provided at the secondary side, and the conduction angle of the auxiliary main switching element is controlled in accordance with the level of the DC output low voltage, whereby the power loss due to the cross regulation of the DC output low voltage can be reduced and the power conversion efficiency can be enhanced.

DETAILED DESCRIPTION OF THE PREFERRED EMBODIMENTS

Preferred embodiments according to the present invention will be described hereunder with reference to the accompanying drawings.

Figure 1:
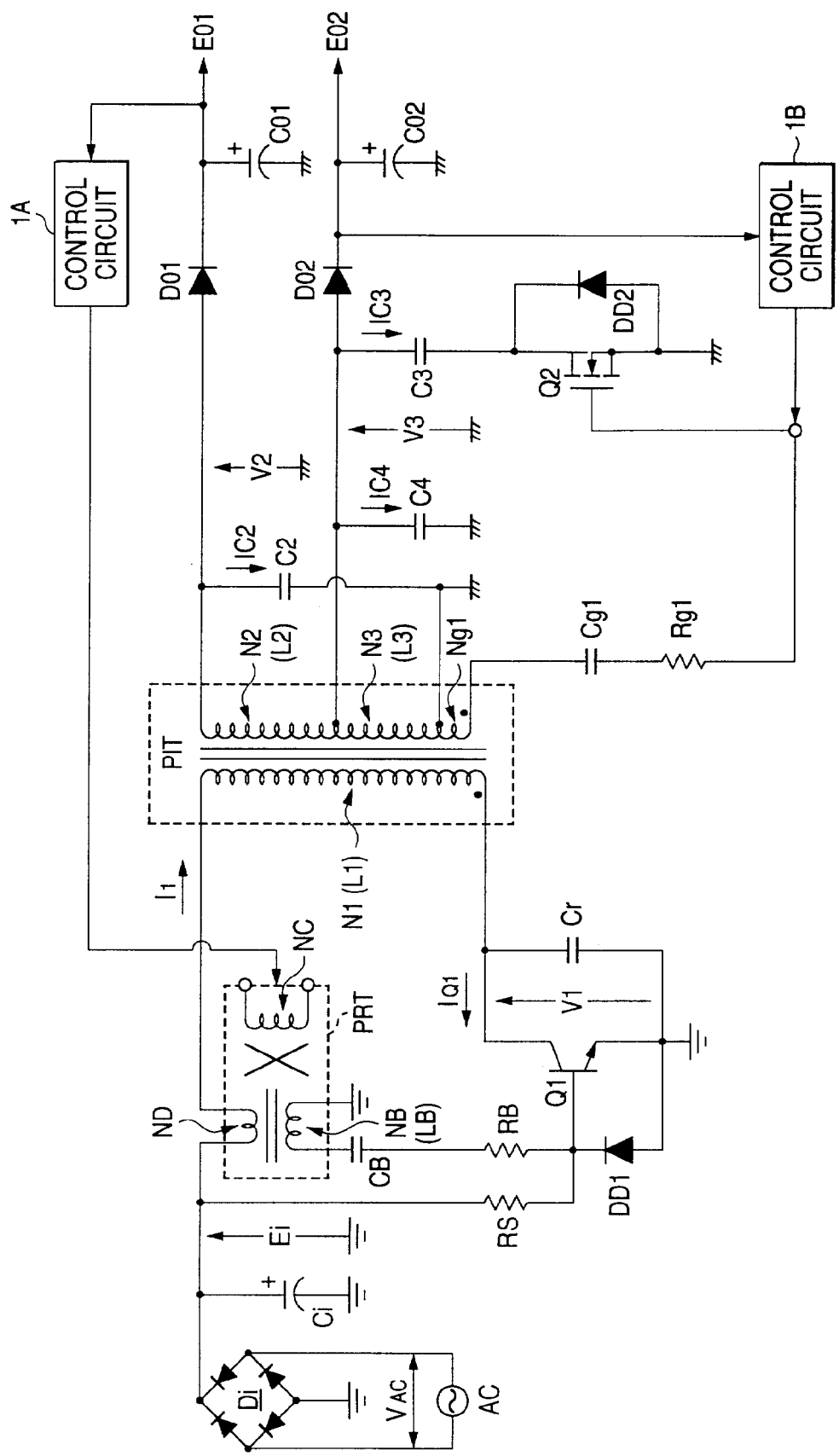
FIG. 1 is a circuit diagram showing the construction of a switching power supply circuit according to an embodiment of the present invention.

FIG. 1 shows the construction of a switching power supply circuit according to an embodiment of the present invention.

In the power supply circuit shown in FIG. 1, a full-wave rectifying circuit comprising a bridge rectifying circuit Di and a smoothing capacitor Ci is equipped as a rectifying and smoothing circuit to which commercial alternating power (alternating input voltage VAC) is input to achieve a DC input voltage, and a rectified and smoothed voltage Ei having the level which is once as large as the alternating input voltage VAC.

A one-stone switching element Q1 is equipped as a switching converter for receiving and intermitting the rectified and smoothed voltage Ei (DC input voltage), thereby providing a voltage resonance type converter for performing a switching operation based on a single end system.

In this case, a self-excited type is adopted as the voltage resonance type converter which performs the single end operation with a one-stone switching element Q1. A bipolar transistor having a high voltage resistance (BJT: junction type transistor) is used for the switching element Q1.

A series resonance circuit for self-excited driving which comprises a series connection circuit of a driving winding NB, a resonance capacitor CB and a base current limiting resistor RB is connected between the base of the switching element Q1 and the earth at the primary side.

Further, a route for clamp current which flows when the switching element Q1 is turned off is formed by a clamp diode DD inserted between the base of the switching element Q1 and the cathode of the smoothing capacitor Ci (the earth at the primary side). A starting resistor RS is inserted to achieve the base current at the starting time from a rectifying and smoothing line.

A parallel resonance capacitor Cr is connected in parallel between the collector and emitter of the switching element Q1. A primary parallel resonance circuit of the voltage resonance type converter is formed by the capacitance of the parallel resonance capacitor Cr itself and the leakage inductance L1 of the primary winding N1 side of the insulating converter transformer PIT.

An orthogonal control transformer PRT shown in FIG. 1 is a saturable reactor around which a resonance current detecting winding ND, a driving winding NB and a control winding NC are wound. The orthogonal control transformer PRT is used to drive the switching element Q1 and perform voltage-stabilizing control. As shown in FIG. 1, the resonance current detecting winding ND and the driving winding NB are wound around the orthogonal control transformer PRT, and also the control winding NC is wound around the orthogonal control transformer PRT in the direction orthogonal to the winding direction of the resonance current detecting winding ND and the driving winding NB.

In the orthogonal control transformer PRT, the switching output achieved at the resonance current detecting winding ND is induced in the driving winding NB through transcoupling, whereby drive current is output from the series resonance circuit (NB, CB) forming a self-excited oscillation circuit through the base current limiting resistor RB to the base of the switching element Q1, whereby the switching element Q1 carries out the switching operation at the switching frequency determined on the basis of the resonance frequency of the series resonance circuit. The switching output achieved at the collector of the switching element Q1 is transferred to the primary winding N1 of the insulating converter transformer PIT.

The insulating converter transformer PIT is provided to transfer the switching output of the switching converter achieved at the primary side to the secondary side.

Figure 2:
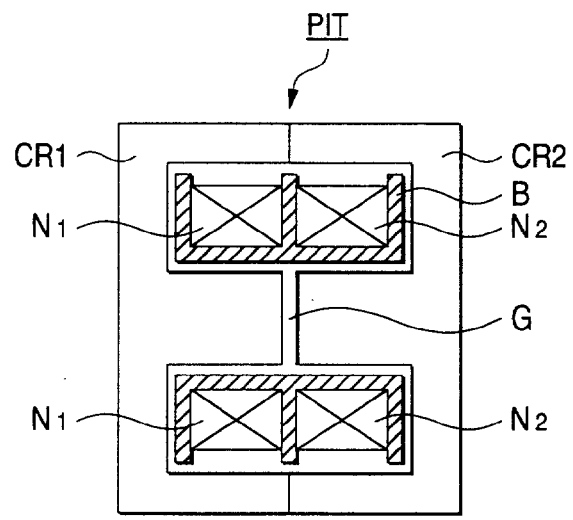
FIG. 2 is a cross-sectional view showing the construction of an insulating converter transformer.

As shown in FIG. 2, the insulating converter transformer PIT is equipped with an EE-type core comprising two E-type cores CR1, CR2 of ferrite material which are assembled so that the magnetic legs thereof are confronted to each other, and the primary winding N1 and the secondary winding N2 are wound around the center magnetic leg of the EE-type core while they are separated from each other by using a dividing bobbin B. Further, the center magnetic leg is designed to have a gap G therein, thereby achieving loose coupling based on a required coupling coefficient.

The gap G can be formed by making the center magnetic leg of each of the E-type cores CR1, CR2 shorter than the two outer magnetic legs thereof. Further, the coupling coefficient k is set to about 0.7 to 0.8 so that loose coupling can be attained, and thus it is harder to achieve the saturation state.

As shown in FIG. 1, the winding-starting end portion of the primary winding N1 of the insulating converter transformer PIT is connected to the collector of the switching element Q1, and the winding-ending end portion is connected to the anode of the smoothing capacitor Ci (rectified and smoothed voltage Ei) through the detecting winding ND. Accordingly, the switching output of the switching element Q1 is supplied to the primary winding N1, thereby generating an alternating voltage having the period corresponding to the switching frequency.

The alternating voltage induced by the primary winding N1 occurs in the secondary winding N2 at the secondary side of the insulating converter transformer PT. In this case, the secondary parallel resonance capacitor C2 is connected to the secondary winding N2 in parallel, so that a first parallel resonance circuit is formed by the leakage inductance L2 of the secondary winding N2 and the capacitance of the secondary parallel resonance capacitor C2. The parallel resonance circuit sets the alternating voltage induced in the secondary winding N2 to a resonance voltage, and thus the voltage resonance operation is performed at the secondary side. That is, the power supply circuit of this embodiment has the construction of a "composite resonance type switching converter" in which a parallel resonance circuit for setting the switching operation to a voltage resonance type is provided at the primary side, and also a parallel resonance circuit for achieving the voltage resonance operation is provided at the secondary side.

At the secondary side of the power supply circuit thus formed, a rectifying diode D01 and a smoothing capacitor C01 is connected to the secondary parallel resonance circuit comprising the secondary winding N2 and the secondary parallel resonance capacitor C2 in a connection style shown in FIG. 1 to thereby form a half-wave rectifying circuit, and a secondary DC output main voltage E01 is mainly generated by the half-wave rectifying circuit (D01, C01). The secondary DC output main voltage E01 is equal to about 135V, for example.

The secondary DC output main voltage E01 is branched and input to a control circuit 1A, and the control circuit 1A generates a control signal to stabilize the DC output main voltage E01.

That is, in the control circuit 1A, the level of the control current (DC current) flowing in the control winding NC is varied in accordance with variation of the level of the DC output main voltage E01. Accordingly, the inductance LB of the driving winding NB is variable, and the resonance frequency of the series resonance circuit in the self-excited oscillation driving circuit, that is, the switching frequency of the switching element Q1 is variably controlled, thereby stabilizing the DC output main voltage E01.

Here, when the switching frequency is variably controlled, the period TOFF during which the switching element Q1 is off is set to a fixed value, and under this condition, the period TON during which the switching element Q1 is on is variably controlled. In this specification, such composite control as described above will be referred to as "composite control system".

With respect to the operation at the secondary side of the insulating converter transformer PIT, two cases where the mutual inductance M between the inductance L1 of the primary winding N1 and the inductance L2 of the secondary winding N2 is equal to +M (additive polarity) and where the mutual inductance M is equal to −M (subtractive polarity) exist in accordance with the polarities (winding direction) of the primary winding N1 and the secondary winding N2, the connection relationship between the rectifying diodes D01, D02 and the polarity variation of the alternating voltage excited in the secondary winding N2.

Figure 3A:
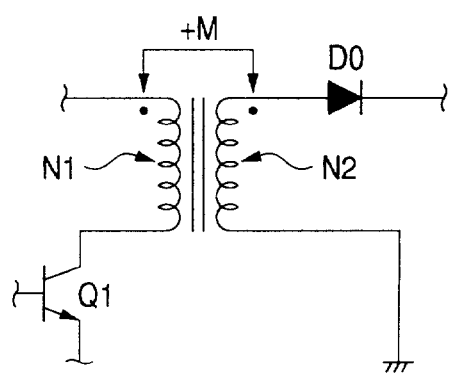
FIGS. 3A and 3B is an equivalent circuit diagram showing each operation when mutual inductance is equal to +M/−M.
Figure 3B:
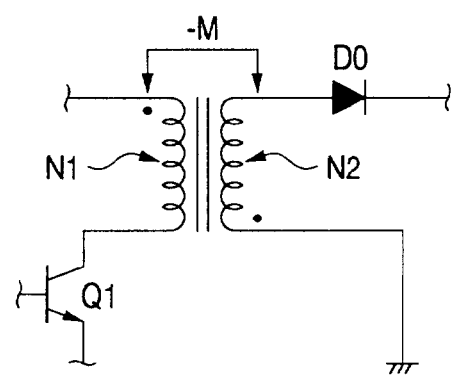

For example, when it is equivalent to the circuit shown in FIG. 3A, the mutual inductance M is equal to +M, and when it is equivalent to the circuit shown in FIG. 3B, the mutual inductance M is equal to −M.

Comparing this operation with the operation at the secondary side shown in FIG. 1, when the alternating voltage achieved at the secondary winding N2 has positive polarity, the rectified current flows in the secondary rectifying diode (D01) in the half-wave rectifying circuit of the secondary side, and thus this operation can be regarded as an operation mode of +M (forward operation).

The polarities of the primary winding N1 and the secondary winding N2 of the insulating converter transformer PIT may be the additive polarity coupling or the subtractive polarity coupling. Further, the winding directions of the primary winding N1 and the secondary winding N2 are set to be the same or opposite to each other. In any case, the coupling coefficient is set to 0.7 to 0.8 to achieve the loose coupling.

In the power supply circuit of this embodiment, a tap output is provided to the secondary winding N2 at the secondary side of the insulating converter transformer PIT as shown in FIG. 1. The number of turns of the winding portion between the tap of the secondary winding N2 and the earth at the secondary side is set to N3. Further, a secondary parallel resonance capacitor C4 is connected to the winding N3 between the tap output line and the earth at the secondary side in parallel, so that a second parallel resonance circuit is formed by the leakage inductance L3 of the winding portion having the winding number N3 and the capacitance of the secondary parallel resonance capacitor C4.

Further, a rectifying diode D02 and a smoothing capacitor C02 are connected to the secondary parallel resonance circuit in the connection manner as shown in FIG. 1 to thereby form the half-wave rectifying circuit. An auxiliary DC output voltage, that is, a secondary DC output low voltage E02 is generated by the half-wave rectifying circuit (D02, C02). The secondary DC output low voltage E02 is set to about 12V, for example.

In the power supply circuit described above, an active clamp circuit is provided at the secondary side. That is, an auxiliary switching element Q2 of MOS-FET, a clamp capacitor C3 and a clamp diode DD2 of a body diode are equipped as the secondary active clamp circuit. Further, a drive winding Ng1, a capacitor Cg1 and a resistor Rg1 are equipped as a driving circuit system for driving the auxiliary switching element Q2.

The clamp diode DD2 is connected between the drain and source of the auxiliary switching element Q2 in parallel. The connection style is set so that the anode of the clamp diode DD2 is connected to the source and the cathode thereof is connected to the drain.

The drain of the auxiliary switching element Q2 is connected to the connection point between the tap output line of the secondary winding N2 and the anode of the rectifying diode D02 through the clamp capacitor C3. The source of the auxiliary switching element Q2 is connected to the earth at the secondary side.

Accordingly, the active clamp circuit is constructed by connecting the clamp capacitor C3 to the parallel connection circuit of the auxiliary switching element Q2 and the clamp diode DD2 in series. The circuit thus formed is further connected to the winding portion (winding N3) extending from the intermediate tap of the secondary winding N2 to the earth at the secondary side in parallel.

Further, as shown in FIG. 1, the series connection circuit of the resistor Rg1, the capacitor Cg1 and the drive winding Ng1 is connected to the gate of the auxiliary switching element Q2 as the driving circuit system for the auxiliary switching element Q2. The series connection circuit forms a self-excited driving circuit for the auxiliary switching element Q2. That is, the signal voltage from the self-excited driving circuit is applied to the gate of the switching element Q2 to perform the switching operation.

In this case, the drive winding Ng1 is formed at the winding-start end portion side of the secondary winding N2, and the number of turns thereof is set to 1T (turn). Accordingly, a voltage induced by the alternating voltage achieved in the primary winding N2 occurs in the drive winding Ng1. In this case, the voltages having the opposite polarities are achieved at the secondary winding N2 and the drive winding Ng1 in view of the winding-direction relationship therebetween. The operation of the drive winding Ng1 is guaranteed if the number of turns thereof is equal to 1T, however, it is not limited to this value.

In this embodiment, the switching operation of the auxiliary switching element Q2 is subjected to the PWM control by a control circuit 1B equipped at the secondary side. That is, the secondary DC output low voltage E02 is supplied to the control circuit 1B of the error amplifier, and the control circuit 1B applies the DC control voltage corresponding to the voltage E02 to the gate of the auxiliary switching element Q2 to control the conduction angle of the auxiliary switching element Q2, whereby the DC output low voltage E02 is stabilized with respect to the variations of the alternating input voltage VAC and the load power Po.

The power supply circuit thus constructed was tested under the condition that the resonance capacitor Cr=8200 pF, the resonance capacitor C2=8200 pF, the resonance capacitor C4=0.1 μF, the clamp capacitor C3=3.3 μF, and an auxiliary low on-resistance MOS-FET having a voltage resistance to 5 A/50V was used as the auxiliary switching element Q2.

Figure 4:
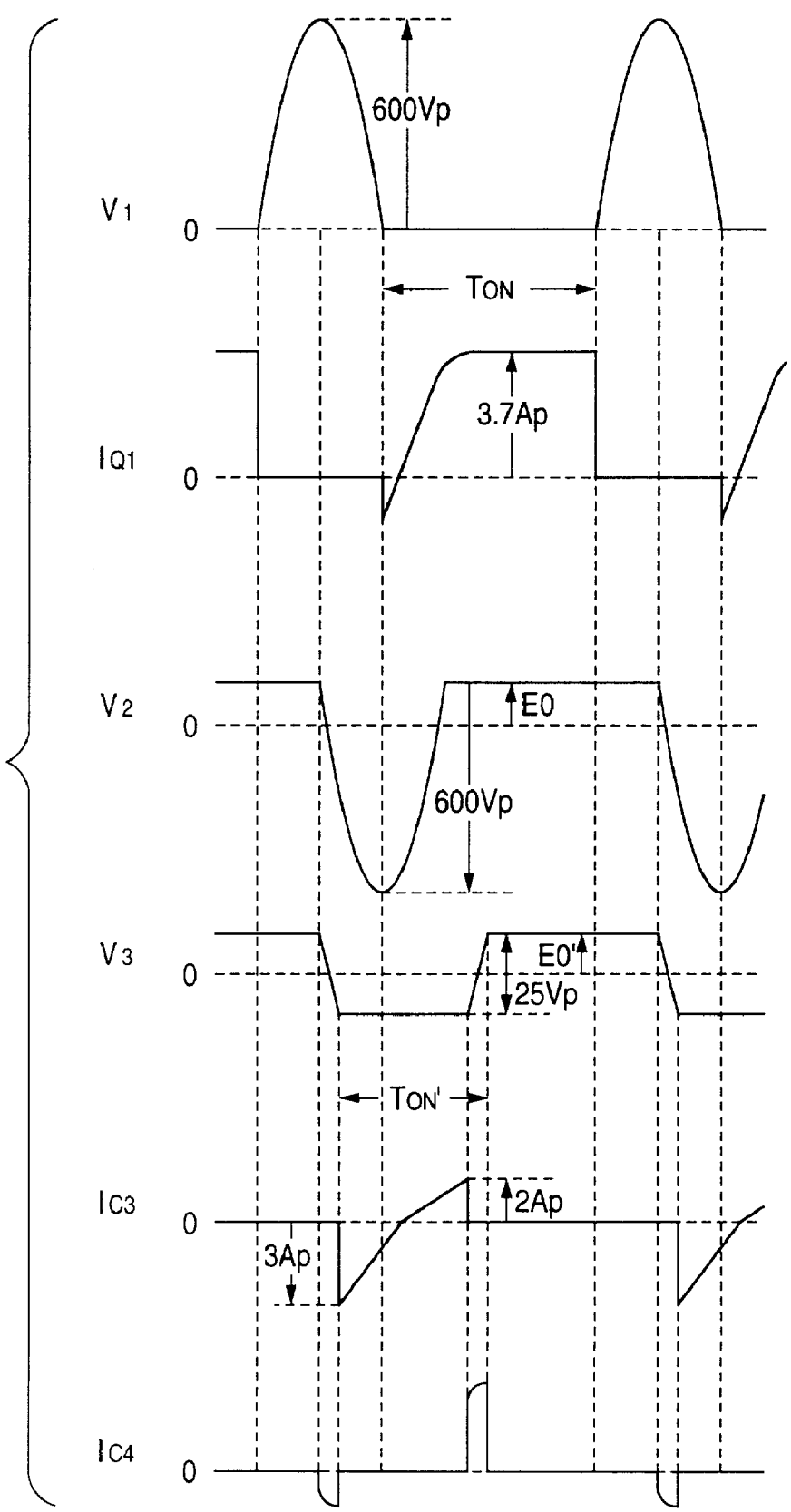
FIG. 4 is a waveform diagram showing the operation of the main part in the power supply circuit of the embodiment of the present invention.

FIG. 4 shows the operating waveforms of the respective parts under the condition that the alternating input voltage VAC=100V, the load power of the DC output main voltage E01 line (135V line) is equal to 182 W, the load power of the DC output low voltage E02 line (12V line) is equal to 18 W (=12V×1.5 A) and the load power Po is equal to 200 W.

Figure 5:
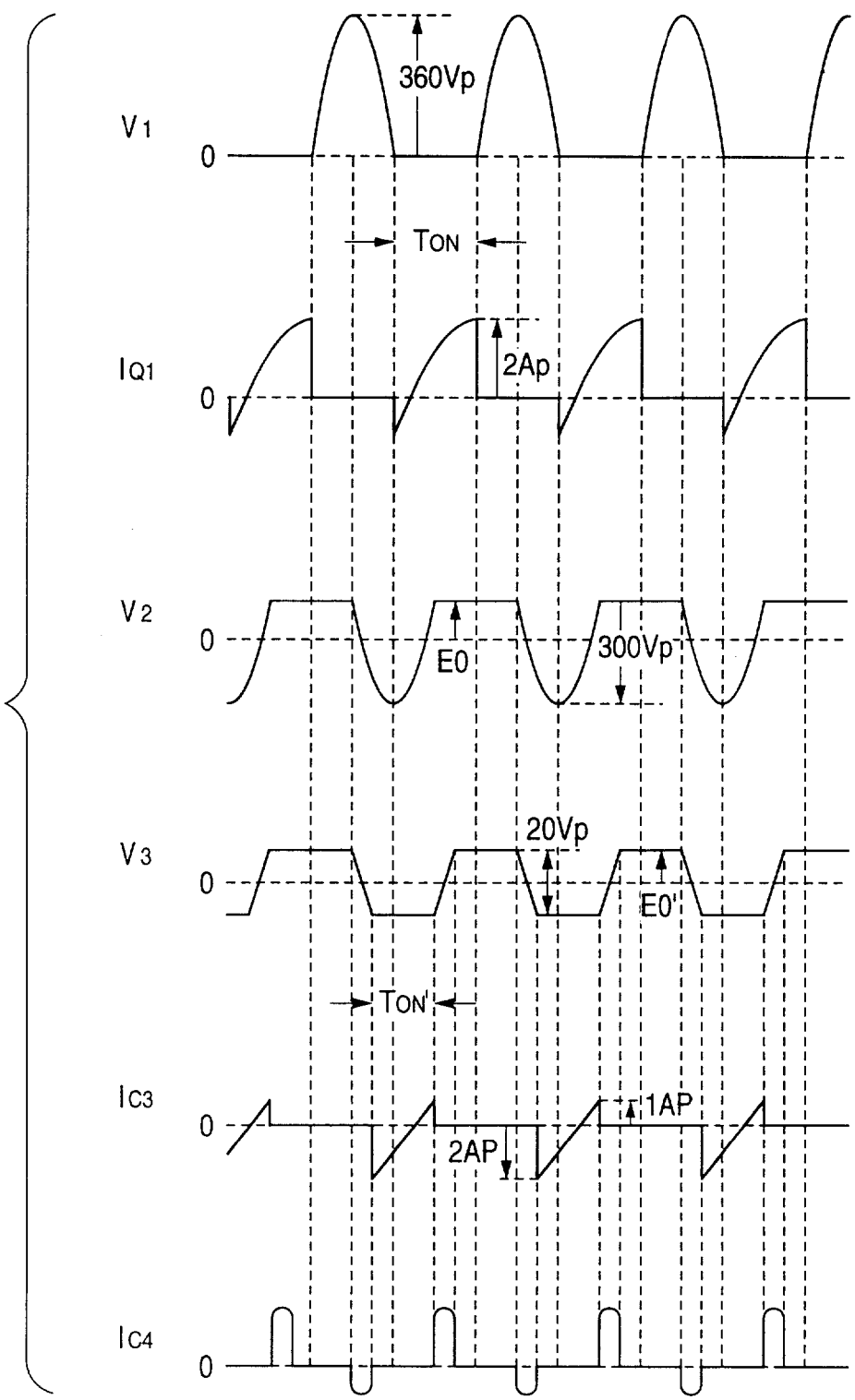
FIG. 5 is a waveform diagram showing the operation of the main part in the power supply circuit of the embodiment of the present invention.

FIG. 5 shows the operating waveforms of the respective parts under the condition that the load power of the DC output main voltage E01 line (135V line) is equal to 32 W, the load power of the DC output low voltage E02 line (12V line) is equal to 18 W (=12V×1.5 A) and the load power Po=50 W.

Figure 6:
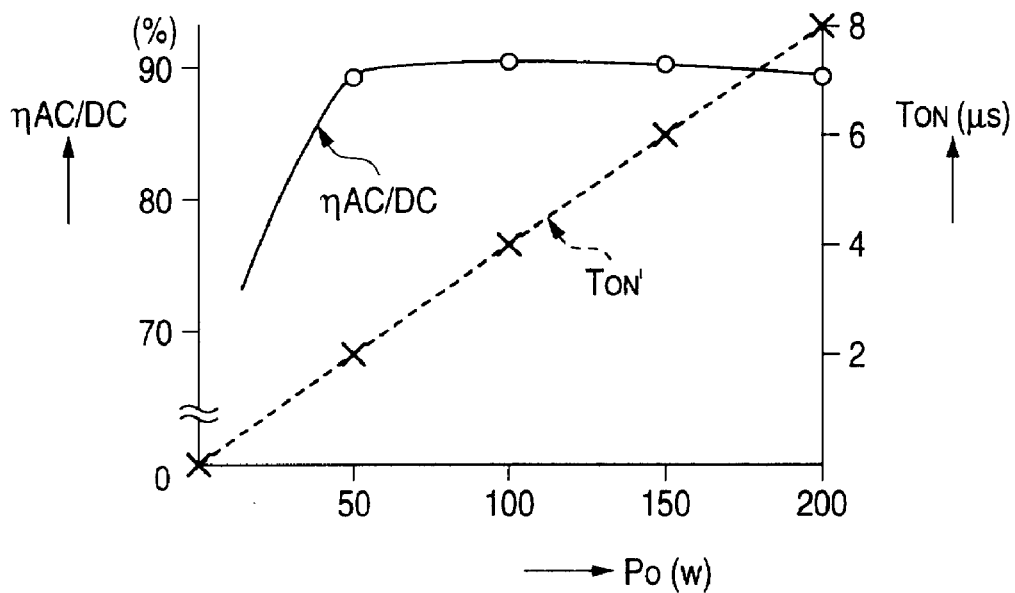
FIG. 6 is a diagram showing characteristics of the power supply circuit of the embodiment with respect to variation of load power.
Figure 7:
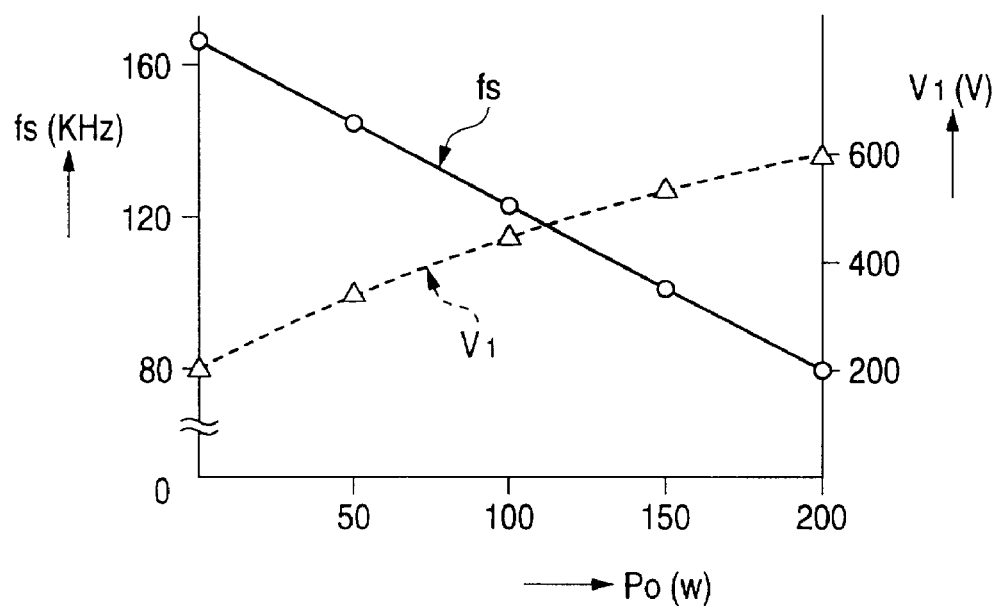
FIG. 7 is a diagram showing characteristics of the power supply circuit of the embodiment with respect to variation of load power.

FIG. 6 shows the characteristics of AC/DC power conversion efficiency ηAC/DC and the conduction angle (TON') of the auxiliary switching element Q2 with respect to variation of the load power Po, and FIG. 7 shows the characteristics of the switching frequency fs and resonance voltage V1 of the switching element Q1 with respect to variation of the load power Po.

As is apparent from FIGS. 4 and 5, with respect to the main switching element Q1, the switching frequency fs and the conduction angle TON are subjected to composite control, and with respect to the auxiliary switching element Q2, the conduction angle (TON') is controlled.

Figure 13:
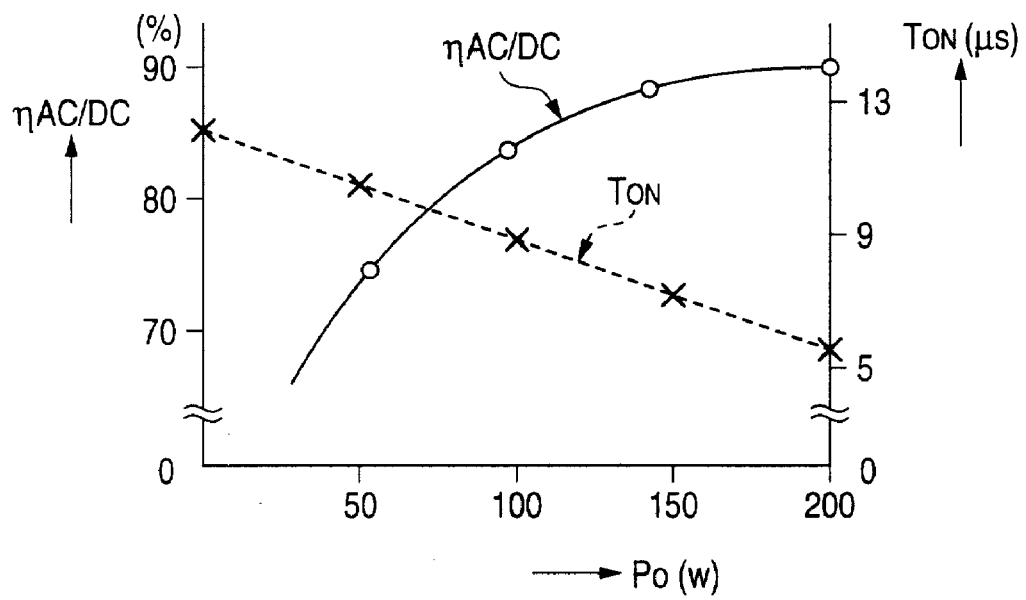
FIG. 13 is a diagram showing the characteristics of power conversion efficiency and conduction angle control with respect to variation of load power in the conventional power supply circuit.
Figure 14:
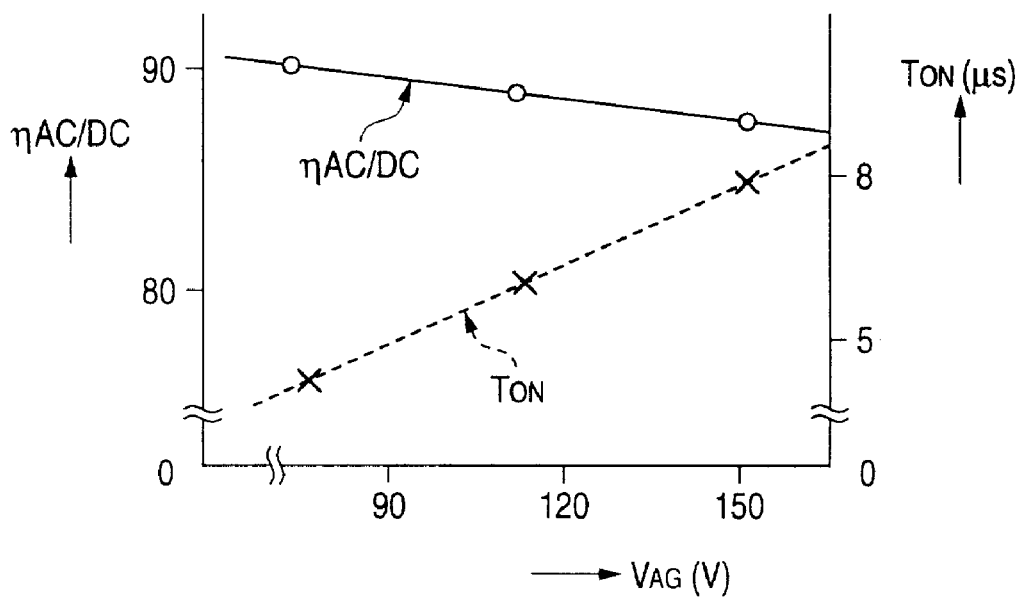
FIG. 14 is a diagram showing the characteristics of the power conversion efficiency and the conduction angle control with respect to variation of an alternating input voltage in the conventional power supply circuit.

As is apparent from the comparison between FIGS. 6, 7 and FIG. 13 for the prior art, this embodiment enhances the AC/DC power conversion efficiency ηAC/DC to 90% or more when the power load Po ranges from 50 W to 200 W.

The resonance voltage V1 is equal to 750V at the alternating input voltage VAC of 144V, and a product having a voltage resistance to 800V may be used as the switching element Q1. In the AC 200V system, a product having a voltage resistance to 1500V may be used.

With respect to the conduction angle (TON') control of the auxiliary switching element Q2, in order to stabilize the cross-regulation voltage 12.5V to 17.5V of the DC output low voltage E02=15V±2.5V to 12V, the control range may be set to 4 μs to 1 μs, and thus the control range is slight. The power loss of the auxiliary switching element Q2 is equal to about 2 W when the load current of the DC output low voltage E02 is equal to 1.5 A, and thus the power loss can be reduced by 6.25 W as compared with the power loss (8.25 W) of the prior art.

Figure 8:
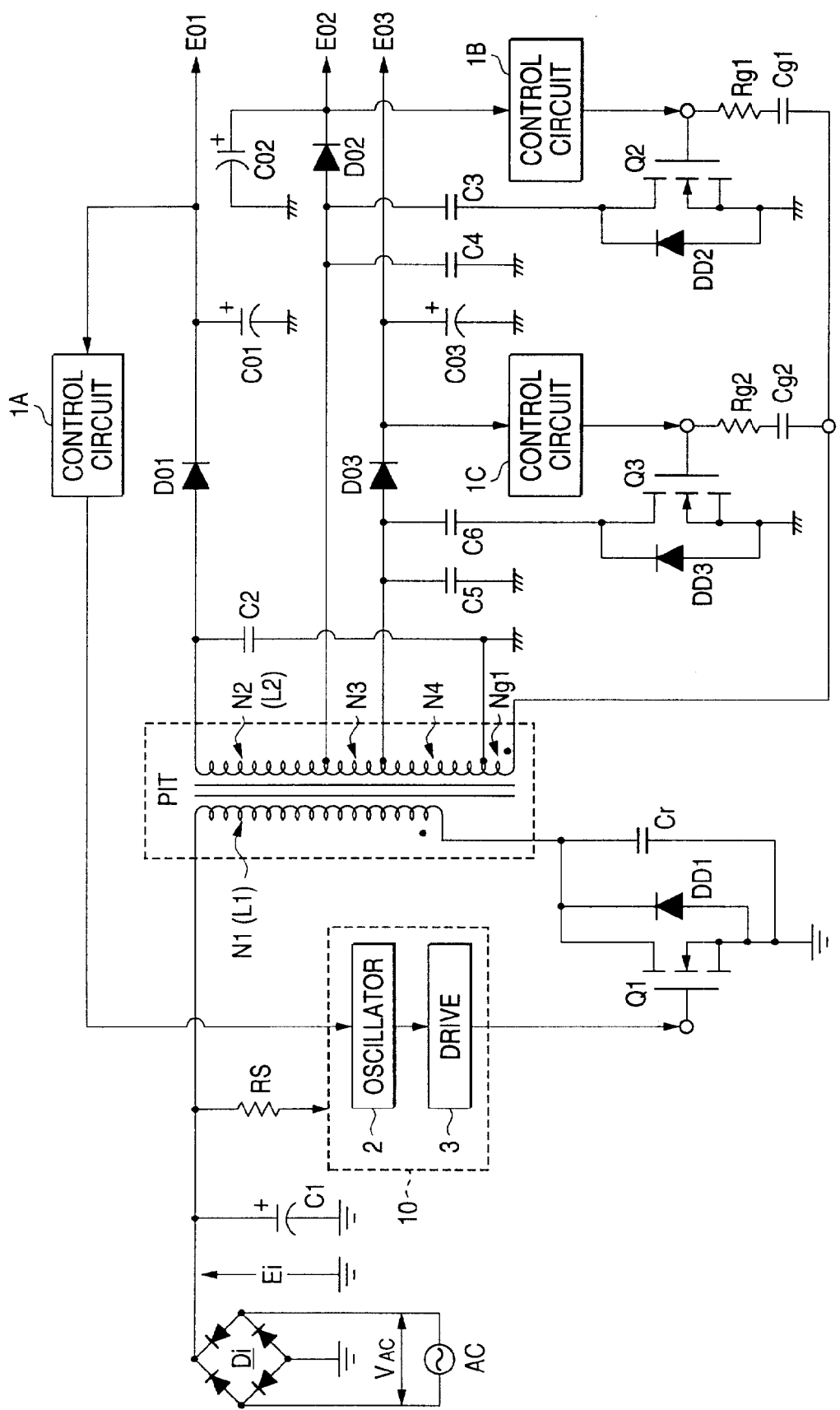
FIG. 8 is a circuit diagram showing the construction of a switching power supply circuit according to another embodiment of the present invention.

FIG. 8 shows a switching power supply circuit according to a second embodiment of the present invention.

FIG. 8 shows a case where the switching element Q1 at the primary side is formed of MOS-FET and a separate excitation type oscillating circuit based on IC is provided in connection with the switching element Q1. The same elements as shown in FIG. 1 are represented by the same reference numerals, and the description thereof is omitted.

In this case, a one-stone switching element Q1 is equipped as a switching converter for receiving and intermitting the rectified and smoothed voltage Ei (DC input voltage), and a voltage resonance type converter for performing a so-called single end type switching operation is provided.

The voltage resonance type converter of this embodiment adopts the separate excitation type construction. The drain of the switching element Q1 of MOS-FET is connected to the anode of the smoothing capacitor Ci through the primary winding N1 of the insulating converter transformer PIT, and the source of the switching element Q1 of MOS-FET is connected to the earth at the primary side.

A parallel resonance capacitor Cr is connected between the drain and source of the switching element Q1 in parallel. A primary parallel resonance circuit is formed by the capacitance of the parallel resonance capacitor Cr and the leakage inductance achieved at the primary winding N1 of the insulating converter transformer PIT. The resonance operation of the parallel resonance circuit is achieved in accordance with the switching operation of the switching element Q1, whereby the switching operation of the switching element Q1 is made to be based on the voltage resonance style.

Further, a clamp diode DD1 based on a so-called body diode equipped to MOS-FET is connected in parallel between the drain and source of the switching element Q1, thereby forming a route for clamp current flowing during the period when the switching element is turned off.

The switching element Q1 is driven to carry out the switching operation, for example, by a switching driving portion 10 comprising an integrated circuit (IC) integrally equipped with an oscillation circuit 2 and a drive circuit 3.

The switching driving portion 10 is connected to the line for the rectified and smoothed voltage Ei through a starting resistor Rs. For example when a power source voltage is applied to the switching driving portion 10 through the starting resistor Rs at the power source turn-on time, the switching driving portion 10 is actuated.

The oscillation circuit 2 of the switching driving portion 10 carries out the oscillation operation having the frequency based on a control signal from the control circuit 1A to output an oscillation signal. The oscillation signal is converted to a drive voltage in the drive circuit 3, and output to the gate of the switching element Q1, whereby the switching element Q1 is allowed to carry out the switching operation based on the oscillation signal generated in the oscillation circuit 2. Accordingly, the switching frequency of the switching element Q1 and the duty of the on/off period in one switching period is dependently determined on the basis of the oscillation signal generated in the oscillation circuit 2.

The oscillation frequency of the oscillation circuit 2 is set so that the control circuit 1A is varied in accordance with variation of the level of the DC output main voltage E01. That is, the switching frequency and conduction angle of the switching element Q1 is variably controlled in accordance with the level of the DC output main voltage E01, thereby stabilizing the DC output main voltage E01.

At the secondary side of the insulating converter transformer PIT, DC output low voltages E02, E03 of two systems are achieved in addition to the DC output main voltage E01.

That is, two tap outputs are provided to the secondary winding N2 as shown in FIG. 8 (the winding portion between the first tap of the secondary winding N2 and the earth at the secondary side is represented by N3 and the winding portion between the second tap of the secondary winding N2 and the earth at the secondary side is represented by N4).

Like the case of FIG. 1, a parallel resonance capacitor C4 is connected to the winding N3 in parallel, and a parallel resonance circuit is formed by the leakage inductance of the winding N3 and the capacitance of the secondary parallel resonance capacitor C4, and further a rectifying diode D02 and a smoothing capacitor C02 are connected to each other in the connection manner shown in FIG. 8 to form a half-wave rectifying circuit. The DC output low voltage E02 is generated by the half-wave rectifying circuit (D02, C02). The secondary DC output low voltage E02 is set to about 12V.

PIT, Like the circuit construction for the winding N3, a parallel resonance capacitor C5 is connected to the winding N4 in parallel, and a parallel resonance circuit is formed by the leakage inductance of the winding N4 and the capacitance of the secondary parallel resonance capacitor C5. Further, a rectifying diode D03 and a smoothing capacitor C03 are connected to each other in the connection manner shown in FIG. 8 to form a half-wave rectifying circuit. The DC output low voltage E03 is generated by the half-wave rectifying circuit (D03, C03). The secondary DC output low voltage E03 is set to about 5V, for example.

In the power supply circuit, an active clamp circuit is equipped to each of the DC output low voltage E02 and E03 lines.

An auxiliary switching element Q2 of MOS-FET, a clamp capacitor C3 and a clamp diode DD2 of a body diode are provided as the active clamp circuit for the DC output low voltage E02 line. Further, a driving circuit system for driving the auxiliary switching element Q2 comprises a drive winding Ng1, a capacitor Cg1 and a resistor Rg1 The active clamp circuit is constructed by connecting the series connection circuit of the auxiliary switching element Q2 and the clamp capacitor C3 to the winding N3 in parallel.

The switching operation of the auxiliary switching element Q2 is subjected to the PWM control by the control circuit 1B. That is, the secondary DC output low voltage E02 is supplied to the control circuit 1B of the error amplifier, and the controller 1B applies the corresponding DC control voltage to the gate of the auxiliary switching element Q2 to control the conduction angle of the auxiliary switching element Q2, whereby the DC output low voltage E02 is stabilized with respect to the variations of the alternating input voltage VAC and the load power Po.

The active clamp circuit for the DC output low voltage E03 line is equipped with an auxiliary switching element Q3 of MOS-FET, a clamp capacitor C6 and a clamp diode DD3 of a body diode. A driving system for the auxiliary switching element Q3 comprises the drive winding Ng1 (commonly used with the driving system of the auxiliary switching element Q2), a capacitor Cg2 and a resistor Rg2. The active clamp circuit is constructed by connecting the series connection circuit of the auxiliary switching element Q3 and the clamp capacitor C6 to the winding N4 in parallel.

Further, the switching operation of the auxiliary switching element Q3 is subjected to the PWM control by a control circuit iC. That is, the secondary DC output low voltage E03 is supplied to the control circuit iC of the error amplifier, and the control circuit iC applies the corresponding DC control voltage to the gate of the auxiliary switching element Q3 to control the conduction angle of the auxiliary switching element Q3, whereby the DC output low voltage E03 is stabilized with respect to the variations of the alternating input voltage VAC and the load power Po.

Figure 9:
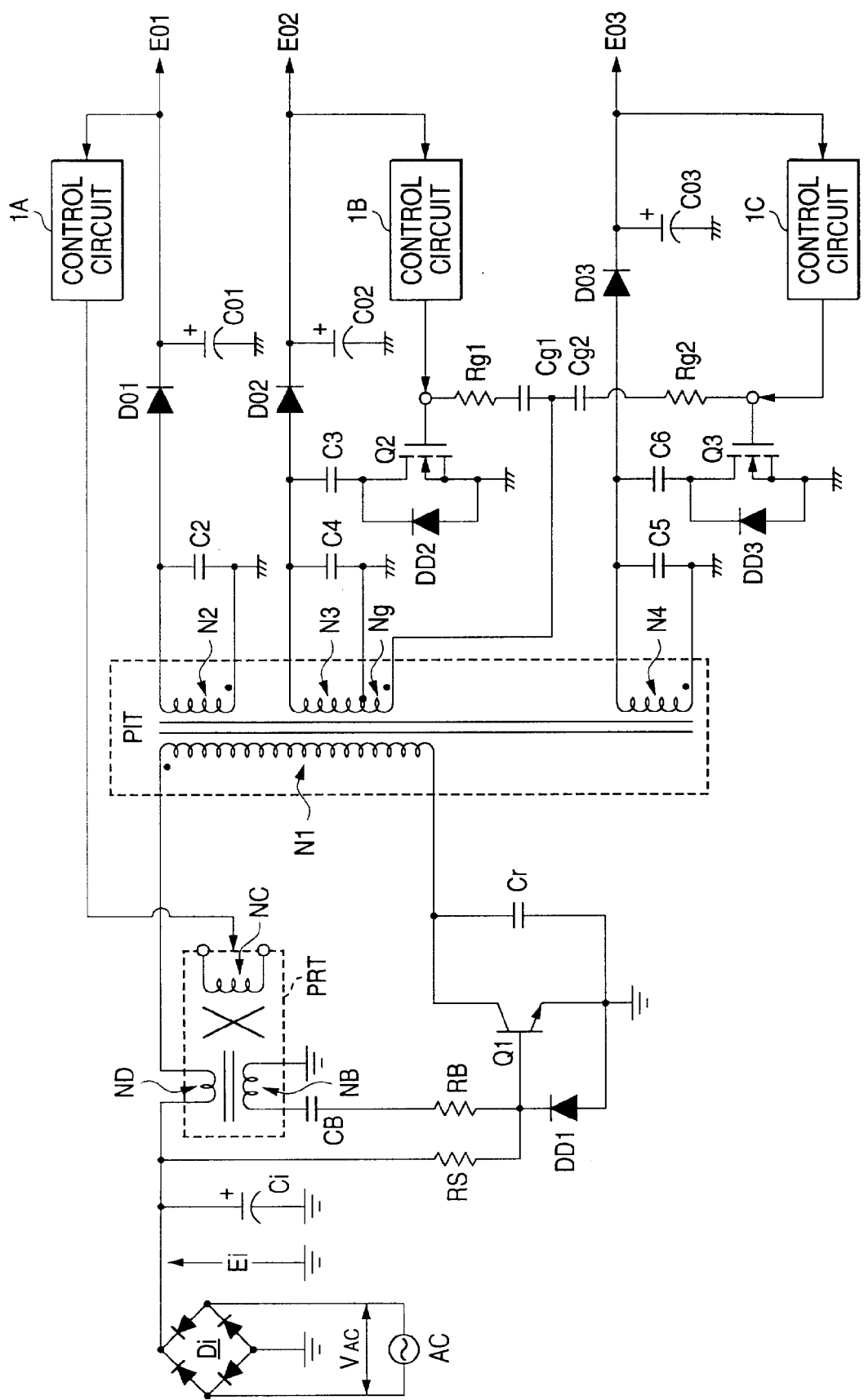
FIG. 9 is a circuit diagram showing the construction of a switching power supply circuit according to another embodiment of the present invention.
Figure 10:
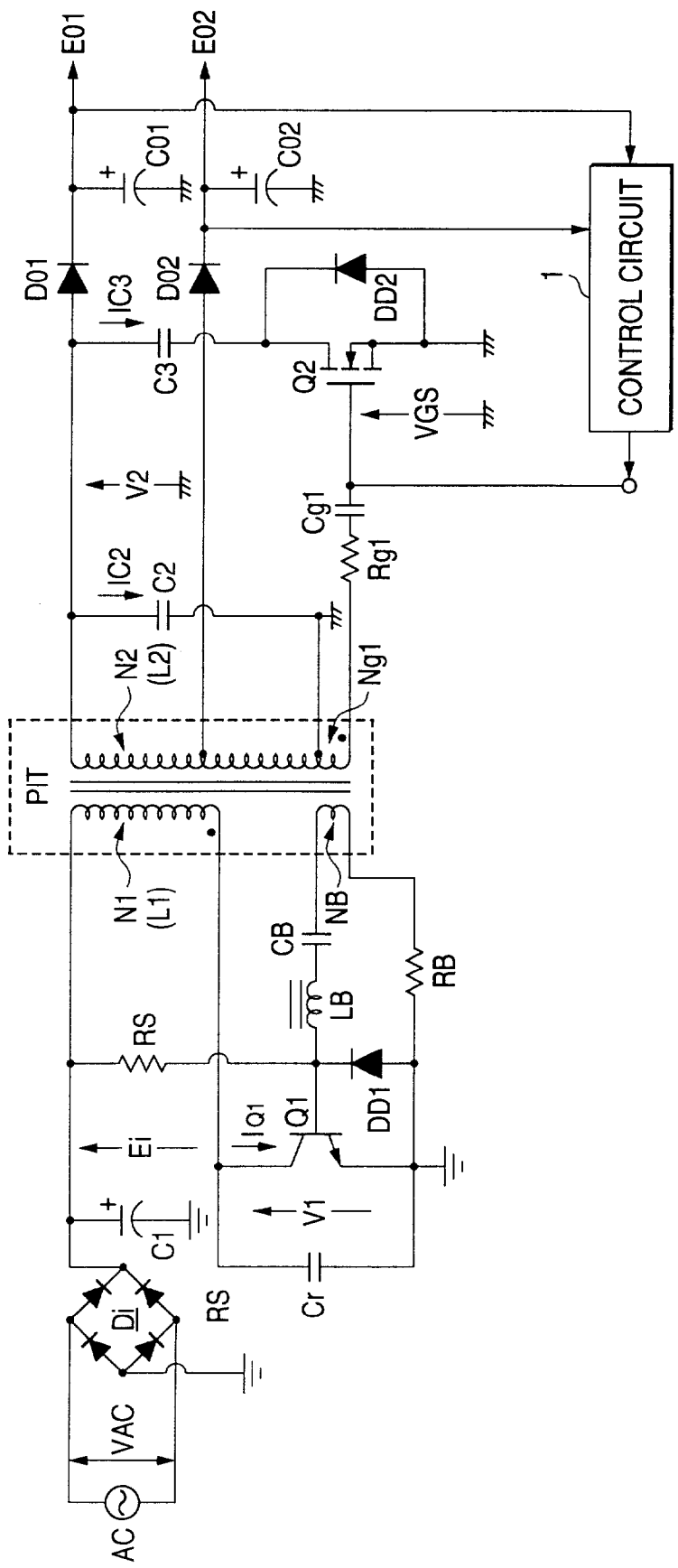
FIG. 10 is a circuit diagram showing the construction of a conventional switching power supply circuit.
Figure 11:
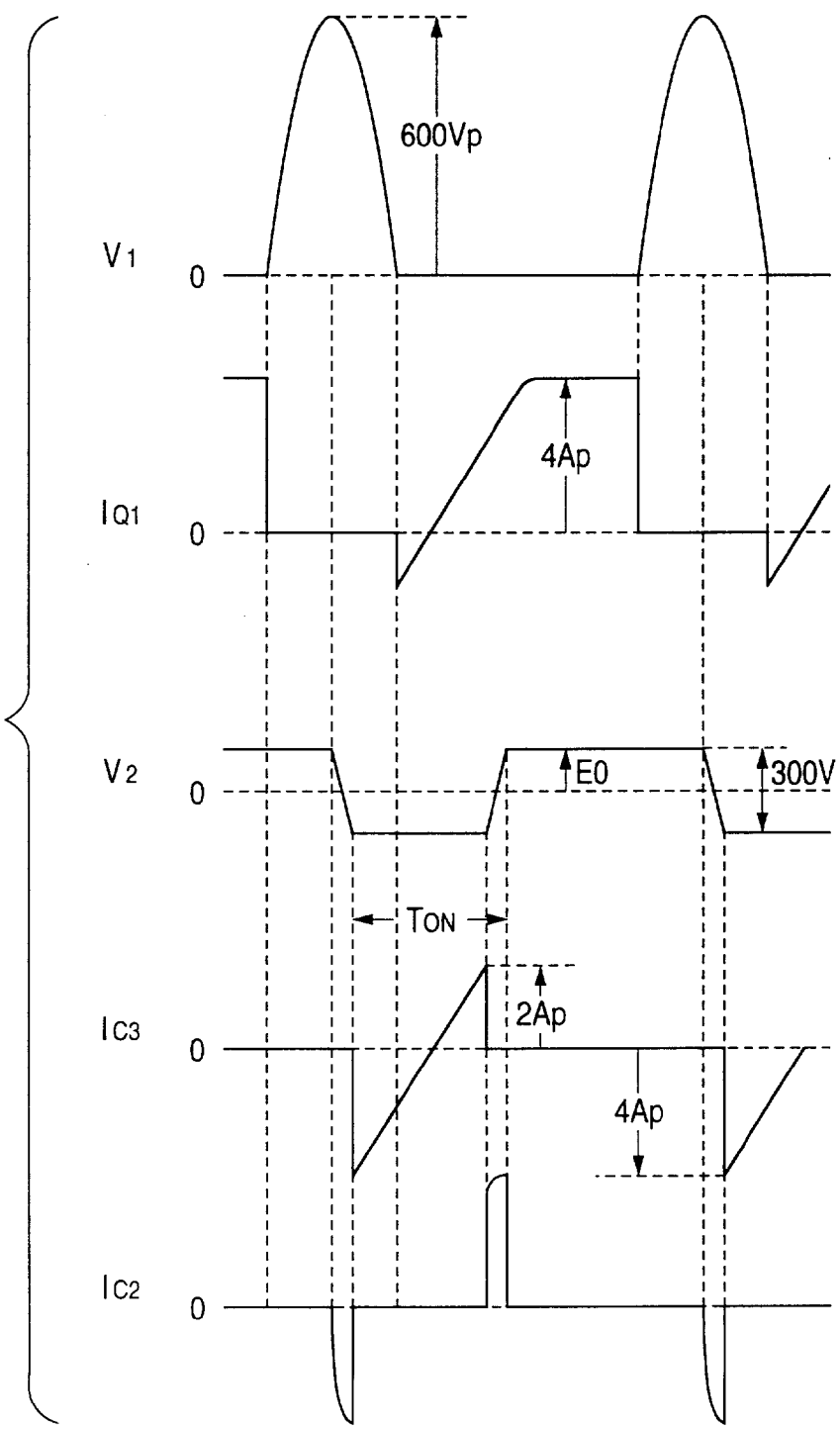
FIG. 11 is a waveform diagram showing the operation of the main part of the conventional switching power supply circuit.
Figure 12:
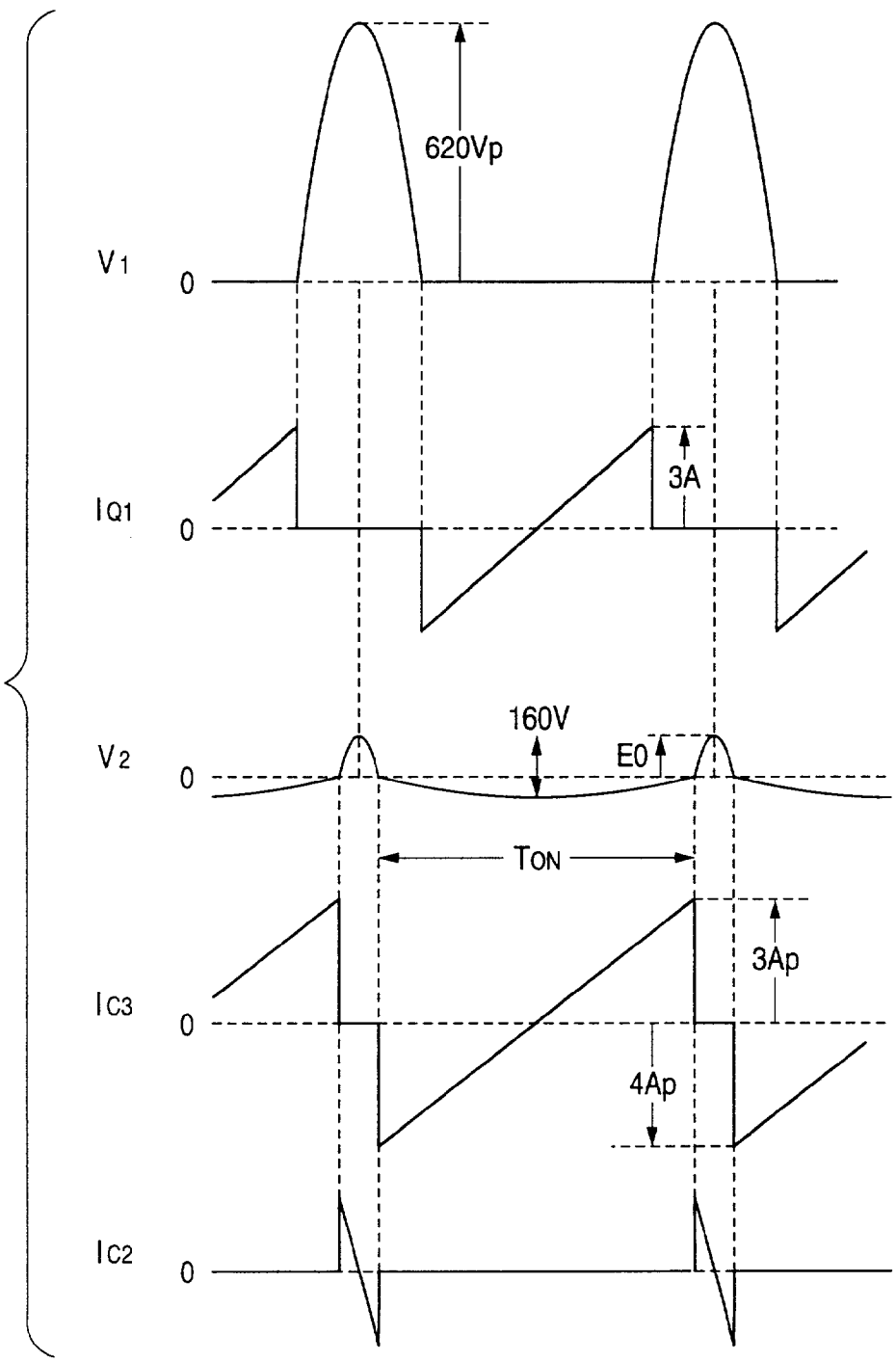
FIG. 12 is a waveform diagram showing the operation of the main part of the conventional switching power supply circuit.

FIG. 9 shows a switching power supply circuit according to a third embodiment of the present invention. In this embodiment, the construction of the primary side of the insulating converter transformer PIT is the same as shown in FIG. 1. With respect to the construction of the secondary side, the connection manner of each element is the same as the embodiment of FIG. 8, however, the windings N3 and N4 are provided separately from the secondary winding N2. The drive winding Ng1 is formed at the winding-start end portion of the winding N3 by 1T, for example. This embodiment is suitably applied to a case where the output current of the DC output low voltage E02, E03 is equal to a large current value such as 2 A or more.

The embodiments shown in FIGS. 8 and 9 are directed to a case where two or more pairs of DC output low voltages (E02, E03, . . . ) in addition to the DC output main voltage E01 are taken out at the secondary side, and an active clamp circuit is added to each DC output low voltage line as shown in FIGS. 8 and 9.

In the second and third embodiments, the insulating converter transformer PIT can be implemented in any combination case where the polarities of the primary winding N1 and the secondary winding N2 are in additive polarity relationship or subtractive polarity relationship and the winding directions thereof are the same (coaxial) or opposite to each other.

The foregoing description is made on the power supply circuit according to the embodiments of the present invention. However, the present invention is not limited to the above-described embodiments. For example, the main switching element Q1 is not limited to the bipolar transistor, and it may be formed of MOS-FET, BJT, IGBT or the like.

The auxiliary switching element Q2 may be formed of BJT, IGBT or the like. Further, another element such as SIT (Static Induction Thyristor) or the like may be used.

The secondary rectifying circuit formed so as to contain the secondary resonance circuit is also not limited to the construction of the above-described embodiments, and another circuit construction may be adopted.

As is understood from the foregoing description, in the composite resonance type switching converter having the active clamp means at the secondary side, the AC/DC power conversion efficiency can be enhanced. Particularly, the invalid power when the load power is below ½ (i.e., under a light load) can be reduced. For example, the invalid power can be reduced by about 4 W at the load power of 200 W, and it can be reduced by 11 W under no-load state.

Further, the power loss to stabilize the voltage due to the cross-regulation (voltage variation) of the DC output low voltage can be greatly reduced.

Still further, the voltage resistance of the main switching element can be reduced from 900V to 800V in the case of AC 100V system, and from 1800V to 1500V in the case of AC 200V system. Further, the voltage resistance of the auxiliary switching element can be reduced from 400V to 50V. From this effect, enhancement of the switching characteristics and reduction of the cost of the power supply circuit can be promoted.

What is claimed is:

1. A switching power supply circuit, characterized by comprising:

switching means having a main switching element for conducting a switching operation on a DC input voltage and outputting a switching result;

an insulating converter transformer that is designed so as to provide a coupling coefficient required for the loose coupling between a primary side and a secondary side, and transmits the output of said switching means achieved at the primary side to the secondary side;

a primary parallel resonance circuit constructed by connecting a primary parallel resonance capacitor to a primary winding wound around said converter transformer in parallel equivalently;

a first secondary parallel resonance circuit constructed by connecting a first secondary parallel resonance capacitor to a secondary winding wound around the insulating converter transformer in parallel;

first DC output voltage generating means for receiving an alternating voltage achieved at said secondary winding wound around said insulating converter transformer and conducting a rectifying operation on the alternating voltage thus received to a DC output main voltage;

first stabilized voltage control means for performing voltage-stabilizing control on the DC output main voltage by controlling the switching frequency and conduction angle of said main switching element in accordance with the level of the DC output main voltage;

a second secondary parallel resonance circuit constructed by connecting, in parallel, a second secondary parallel resonance capacitor to the winding portion between an intermediate tap of said secondary winding wound around said insulating converter transformer and the earth at the secondary side;

second DC output voltage generating means for receiving an alternating voltage achieved at the intermediate tap of said secondary winding wound around said insulating converter transformer and conducting a rectifying operation on the alternating voltage thus received to achieve a DC output low voltage;

active clamp means constructed by connecting, in parallel, a series connection circuit comprising a clamp capacitor and an auxiliary switching element to the winding portion between the intermediate tap of said secondary winding wound around said insulating converter transformer and the earth at the secondary side; and second voltage-stabilizing control means for executing the conduction angle control of said auxiliary switching element in accordance with the level of the DC output low voltage to perform the voltage-stabilizing control on the DC output low voltage.

2. The switching power supply circuit as claimed in claim 1, wherein there are provided a plurality of constructing portions each of which comprises said second secondary parallel resonance circuit, said second DC output voltage generating means, said active clamp means and said second voltage-stabilizing control means.

* * * * *